(12) United States Patent
Guo et al.

(10) Patent No.: US 9,720,109 B2
(45) Date of Patent: Aug. 1, 2017

(54) SYSTEMS AND METHODS FOR MINIMIZING SILICON PHOTOMULTIPLIER SIGNAL PROPAGATION DELAY DISPERSION AND IMPROVE TIMING

(71) Applicant: General Electric Company, Schenectady, NY (US)

(72) Inventors: Jianjun Guo, Balston Spa, NY (US); Sergei Ivanovich Dolinsky, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 141 days.

(21) Appl. No.: 14/609,193

(22) Filed: Jan. 29, 2015

(65) Prior Publication Data
US 2016/0191829 A1 Jun. 30, 2016

Related U.S. Application Data

(60) Provisional application No. 62/096,726, filed on Dec. 24, 2014.

(51) Int. Cl.
*H04N 5/335* (2011.01)
*G01T 1/24* (2006.01)
(Continued)

(52) U.S. Cl.
CPC ............ *G01T 1/248* (2013.01); *G01T 1/208* (2013.01); *G01T 1/2018* (2013.01)

(58) Field of Classification Search
CPC ...................................................... G01T 1/248
(Continued)

(56) References Cited

U.S. PATENT DOCUMENTS 8,110,806 B2   2/2012  Burr et al.
2003/0103037 A1*  6/2003  Rotzoll ................ G06F 3/0317
                                                          345/157
(Continued)

OTHER PUBLICATIONS

Janecek et al., "A High-Speed Multi-Channel Readout for SSPM Arrays", Nuclear Science, IEEE Transactions on, Feb. 2012, (pp. 13-18, 6 pages total).

(Continued)

*Primary Examiner* — Usman Khan
(74) *Attorney, Agent, or Firm* — Pabitra K. Chakrabarti

(57) ABSTRACT

A silicon photomultiplier array including a plurality of microcells arranged in subgroupings, each microcell of a respective subgrouping providing a pulse output in response to an incident radiation. Each microcell output interconnected by respective traces of equal length to either a summing node or an integrated buffer amplifier. Each respective summing node configured to sum the pulse outputs of a first subgroup of the microcell subgroupings, and each respective integrated buffer amplifier configured to sum the pulse outputs of each microcell of a second subgrouping, the respective integrated buffer amplifier located on the silicon photomultiplier array within the second subgroup of microcells. The plurality of microcells arranged in one of columns and rows, and a first group of the arranged plurality of microcells being a mirror image of a second group of the arranged plurality of microcells about a midpoint between one of the columns and rows.

17 Claims, 16 Drawing Sheets

(51) Int. Cl.
*G01T 1/20* (2006.01)
*G01T 1/208* (2006.01)

(58) Field of Classification Search
USPC .......................................................... 348/301
See application file for complete search history.

(56) References Cited

U.S. PATENT DOCUMENTS

| | | | |
|---|---|---|---|
| 2006/0043313 A1* | 3/2006 | Caccia | G01T 1/026 250/484.5 |
| 2010/0020121 A1* | 1/2010 | Mizes | B41J 2/0451 347/19 |
| 2010/0051784 A1* | 3/2010 | Parks | H04N 3/1562 250/208.1 |
| 2011/0079727 A1 | 4/2011 | Prescher et al. | |
| 2011/0233413 A1 | 9/2011 | Prescher et al. | |
| 2013/0313414 A1 | 11/2013 | Pavlov et al. | |
| 2014/0029715 A1 | 1/2014 | Hansen et al. | |
| 2014/0183370 A1* | 7/2014 | Bavendiek | G01N 23/185 250/366 |

OTHER PUBLICATIONS

Mandai et al., "Timing optimization of a H-tree based digital silicon photomultiplier", Journal of Instrumentation, vol. 8, Sep. 25, 2013, DOI: 10.1088/1748-0221/8/09/P09016, 9pgs.

Dey et al., "A Row-Column Summing Readout Architecture for SiPM based PET Imaging Systems", Nov. 2013, (pp. 1-5, 5 pages total).

Mandai et al., "Timing optimization utilizing order statistics and multichannel digital silicon photomultiplier", Optics Letter, vol. 39, No. 3, Feb. 1, 2014, (pp. 552-554, 3 pages total).

Mandai, Shingo et al., "Analysis of timing resolution of a digital silicon photomultiplier", IEEE Nuclear Science Symposium and Medical Imaging Conference (NSS/MIC), NPO1-96, 2013, Jul. 18, 2013, 3pgs.

* cited by examiner

SYSTEMS AND METHODS FOR MINIMIZING SILICON PHOTOMULTIPLIER SIGNAL PROPAGATION DELAY DISPERSION AND IMPROVE TIMING

CLAIM OF PRIORITY

This patent application claims the benefit of priority, under 35 U.S.C. §119, of U.S. Provisional Patent Application Ser. No. 62/096,726, filed Dec. 24, 2014, titled "SYSTEMS AND METHODS FOR EQUALIZATION OF SILICON PHOTOMULTIPLIER SIGNAL PROPAGATION DELAY DISPERSION" the entire disclosure of which is incorporated herein by reference.

BACKGROUND

Radiation detection approaches exist that employ photo sensors incorporating a microcell (e.g., a single photon avalanche diodes (SPAD)) operating in Geiger mode. Certain of these approaches have been implemented in large area devices, such as may be used in nuclear detectors. A readout pixel can be made up of an array of microcells, where each individual microcell can be connected to a readout network via a quenching resistor exhibiting resistance between 100 kΩ to 1 MΩ. When a bias voltage applied to the SiPM is above breakdown, a detected photon generates an avalanche, the APD capacitance discharges to a breakdown voltage and the recharging current creates a signal.

Typically, the pulse shape associated with a single photo electron (SPE) signal has a fast rise time, followed by a long fall time. When detecting fast light pulse (e.g., on the order of tens of nanoseconds) such signals are aggregated across the numerous microcells forming a pixel of a silicon photomultiplier (SiPM) device. The resulting pulse shape of the summed signal has a slow rise time (e.g., in the tens of nanoseconds) due to the convolution of single microcell responses with detected light pulse. Therefore, it is difficult to achieve good timing resolution with these devices due to the slow rise time of the aggregated signal for a given light pulse.

To address the problem of slow rise times, digital SiPMs (dSiPM) can be employed. In this approach, special electronic circuitry for each microcell (e.g., a SPAD) is produced on the same silicon wafer using a complementary metal-oxide semiconductor (CMOS) process. The function of this circuitry is to detect avalanche events and to actively quench the microcell. Each circuitry has a memory element (such as a 1 or more bit element). A special network tree is used to collect time stamps from all the microcells. To get the information of the number of detected photons per event a special read out cycle is executed, which requires a special digital controller for each dSiPM. Such an approach is undesirably complex.

Analog SiPM can have the pixel outputs wire-summed and bonded-out by wires attached to the wafer, or by using short vertical interconnects implemented in Through-Silicon-Via (TSV) technology. Microcells can be connected by traces, and typically one or a few pads per array of microcells (pixel) can be used as output (wire bounds or TSV). An analog SiPM typically requires a front-end to buffer (and/or amplify) the signal from the SiPM for further processing. Digital SIPM technology has analog and/or digital electronics built-in to the microcell to produce a digital output pulse. The microcells of a dSiPM communicate with an external controller having typically high clock speeds.

For both analog and digital SiPM devices, due to the variation of signal trace length the propagation delay varies from microcell to microcell, which degrades timing. For analog SiPM devices the signal pulse rise time degrades due to both on- and off-chip parasitics (e.g., bond wire inductance, and PCB signal trace affects) and limited driving capability of a microcell.

Due to the difference in the actual geometry of traces that connect microcells to readout electronics, there can be a significant variation of time delay across pixels. Long circuit traces can also degrade pulse shapes due to propagation dispersion. Attempting to equalize trace length can significantly increase parasitics, and degrade signal pulse shape due to the limited driving capability of the microcell.

A complicated trigger network and an on-chip time-digital-converter (TDC) can be fabricated on the same wafer as the dSiPM to readout timing. The TDC outputs a digitized timing stamp to an external controller (e.g., a field programmable gate array (FPGA)). Photons can also be sensed using a hybrid SiPM (HSiPM), which takes advantage of both the photon counting capability of each microcell and the simplicity of analog SiPM.

In HSiPM, each microcell has built-in active electronics. A firing microcell generates a predefined digital pulse. The digital pulses from all the firing microcells are summed in an analog fashion and output to external electronics for timing and energy readout. Since the microcells in HSiPM generate a digital pulse for every single avalanche, one may use this information for energy readout, instead of digitizing the summed digital pulses.

The conventional method to get the best timing in analog SiPM is to adjust the threshold of the discriminators. Due to the noise in the system, it is impractical to set the threshold low enough to discriminate the vent on the level of several photons (e.g., one photon, two photons) which would provide the best timing. A precise triggering level is difficult to determine due to the limitation of trigger logic trace and the impact parasitics have on signal quality.

DESCRIPTION

Systems and methods in accordance with embodiments, utilize the statistical distribution of arriving photons across SiPM detectors to simplify the on-chip electronic circuitry while providing a precise triggering method. Embodying devices solve the problems of propagation delay dispersion and pulse shape distortion caused by parasitics in SiPM devices. Further, embodying systems and methods can select a trigger level on photon arrival (first, second, etc.) by coding the pulse height.

In accordance with embodiments, a detector system can select a triggering scheme for specific applications. Embodying detector systems can control a triggering network that can provide triggers upon first, second, and/or any arriving photon by adjusting a threshold. Implementation of the detector system can reduce propagation delay dispersion and pulse shape distortion caused by the electrical parasitic components (i.e., capacitance, resistance and inductance) in SiPM devices.

Figure 1:
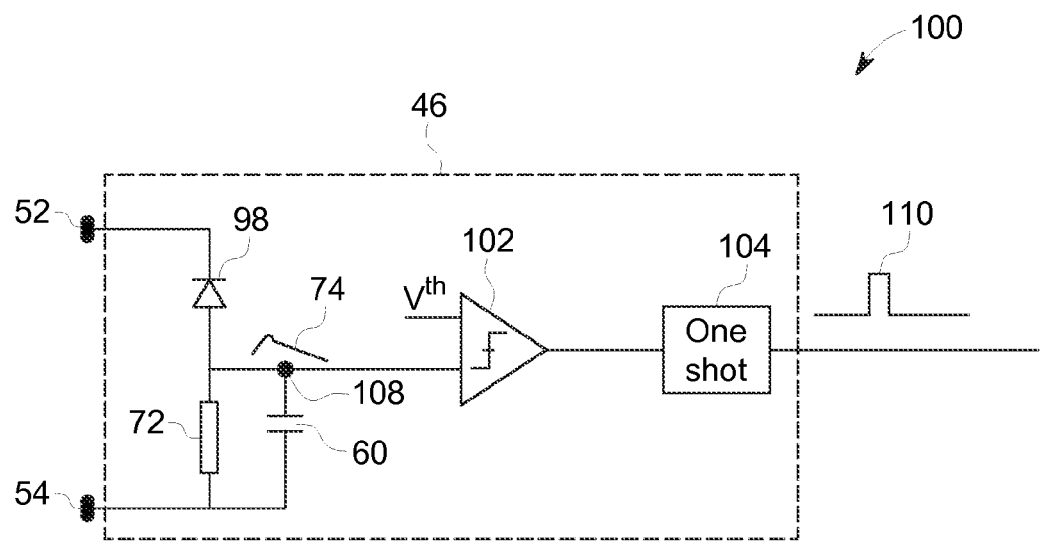
FIG. 1 depicts a schematic model diagram of a HSiPM microcell circuit.

FIG. 1 depicts a schematic diagram of circuit 100 of microcell 46 that includes avalanche photodiode 98. A small electronic circuit can be incorporated into each microcell 46 during fabrication of the SiPM wafer. In one implementation this circuitry can detect the avalanche development in the photodiode, and generate a short digital pulse (e.g., between approximately 0.2 ns to 2.0 ns, such as about 1 ns or less) provided to the readout network (e.g., a "one-shot"). Pulse 74 from the firing microcell 46 has a sharp rising edge with a slow falling tail. Circuit 100 includes comparator 102, such as a Schmitt trigger, followed by one-shot pulse generator 104 to sense the signal at signal sensing node 108. In the depicted example, comparator 102 compares the signal sensed at the signal sensing node 108 with threshold voltage (Vth). That is, circuit 100 operates in a voltage mode in terms of the determination as to whether the one-shot pulse generator is triggered. In the depicted example, the digital one-shot pulse generator is triggered in response to the output of the comparator (i.e., does the signal at the signal sensing node 108 exceed the threshold voltage Vth, if so generate a one-shot pulse, if not, do nothing). In one implementation, the generated pulse is a short duration (e.g., approximately 1 ns or less) digital pulse 110 (such as square waveform) provided for summing over some area (e.g., at the SiPM level) instead of summing the analog pulses conventionally provided (e.g., pulses 74) as output. Digital pulse 110 may take non-square forms, such as a Gaussian or triangular waveform, or any other suitable predetermined waveform type. As will be appreciated, the amplitude and duration of the digital pulse 110 can be values programmable by an external controller. This is in contrast to analog pulses, such as pulse 74 where the amplitude of the analog pulse depends in part on the diode breakdown voltage Vbr, which itself is sensitive to temperature.

The waveform generated by the summing of one-shot pulses from multiple microcells 46 present in a SiPM is a convolution of short duration digital pulses 110. This waveform of pulses 110 can be square waveform (or Gaussian, triangular, or any other predetermined shape) as opposed to long-tailed, analog pulses 74. As a result, the summed, or otherwise aggregated, digital pulses provide a signal output having a short rise time (as opposed to the rise time of conventionally, summed analog signals).

In accordance with embodiments, the timing for an analog SiPM can be improved by including an integrated buffer amplifier within each microcell or group of microcells of the SiPM. Additionally, timing can be improved by including a front-end buffer on the fabricated wafer (with and/or without the integrated buffer amplifier). The buffer can be a unity gain buffer (voltage mode or current mode) or a with a defined gain. In voltage mode, the microcell or group of microcells outputs the current pulse to a load, generates a voltage proportional to the current flowing through the load, and then the voltage signal gets buffered or amplified by the following amplifier.

Figure 11A:
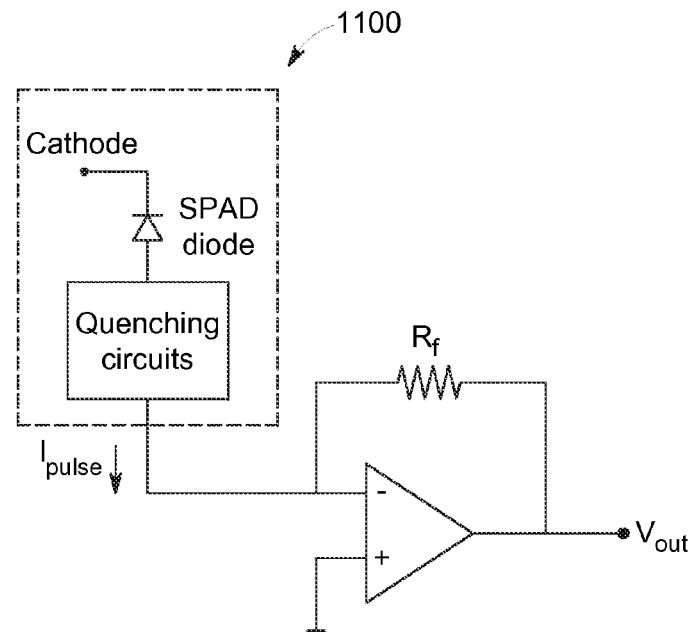
FIGS. 11A-11E depict configurations of a microcell in combination with a buffer amplifier in accordance with some embodiments.
Figure 11B:
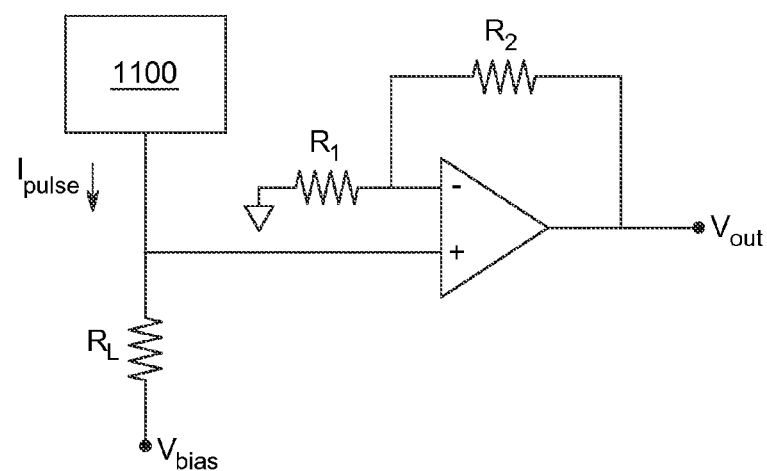
Figure 11C:
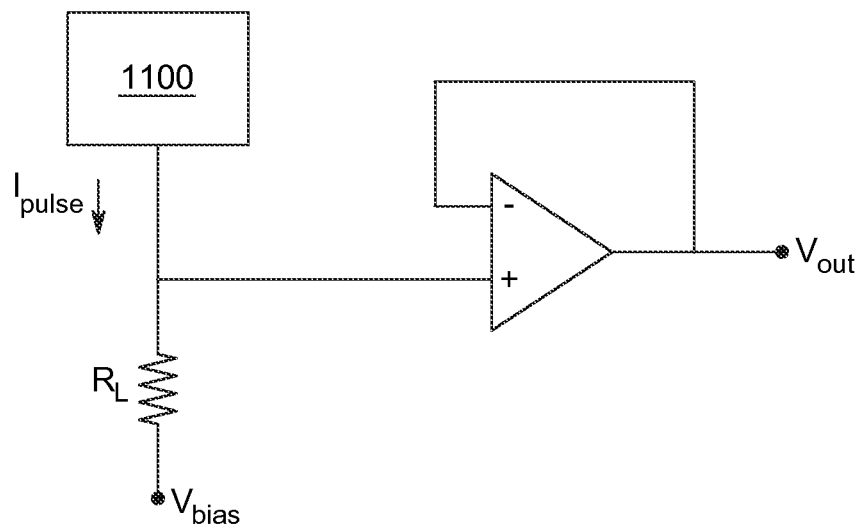

FIGS. 11A-11E depict configurations of microcell 1100 in combination with buffer amplifiers in accordance with embodiments. Microcell 1100 is a simplified electrical model of a conventional silicon photomultiplier pixel, where the microcell could be one of a plurality of microcells within an SiPM array of such cells. The microcell may be part of an array of single photon avalanche diodes (SPAD) operated in Geiger mode within an analog SiPM. The quench circuitry can include a quench resistor 72 and a parasitic quench capacitor 60. Microcell 1100 provides a current pulse Ipulse as output. FIGS. 11A-11C depict voltage mode configurations for the buffer. FIG. 11A depicts a transimpedance configuration, where the signal current Ipulse flows into the transimpedance amplifier and develops a voltage across the feedback resistor Rf. FIG. 11B depicts a non-inverting gain configuration, where the signal current flows into load resistor RL, develops a voltage across the load resistor, then the voltage signal gets amplified by the op-amp in non-inverting configuration with gain set by the voltage divider R1/R2. FIG. 11C depicts a non-inverting unity gain configuration, where: signal current Ipulse flows into load resistor RL, develops a voltage across the load resistor, then the voltage gets buffered by the op-amp in non-inverting unity gain configuration.

Figure 11D:
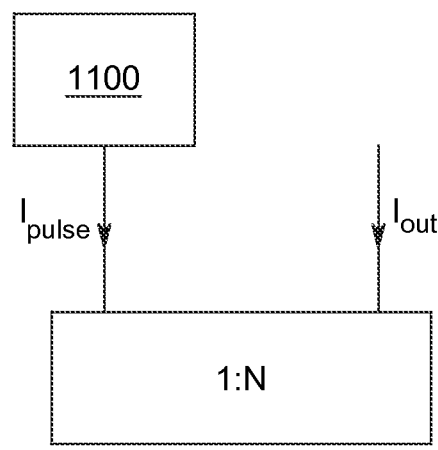
Figure 11E:
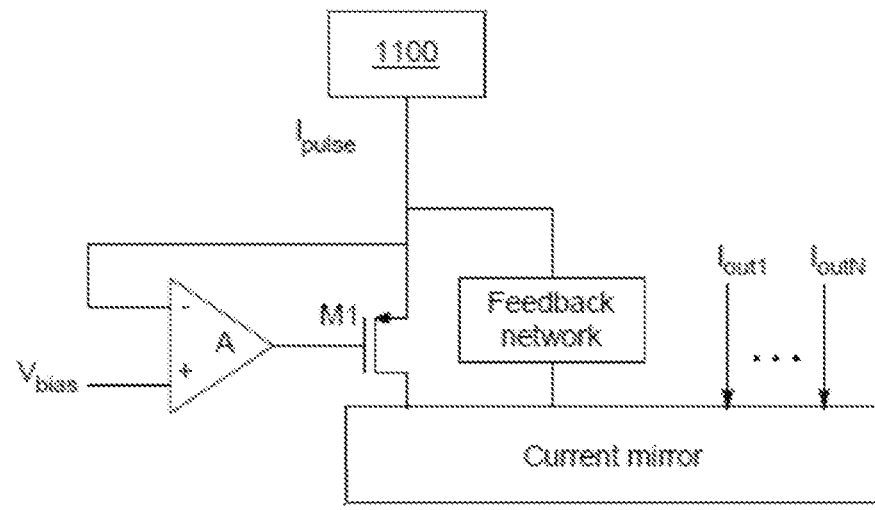

FIGS. 11D-11E depict current mode configurations for the buffer amplifier. FIG. 11D depicts a current buffer with a gain of N, where the signal current Ipulse flows into a current buffer with low input impedance and high output impedance, the output current is a copy of the input current with unity gain or any desirable gain set to value N. FIG. 11E depicts an implementation embodying microcell 1100 in combination with a conventional current buffer.

Figure 2:
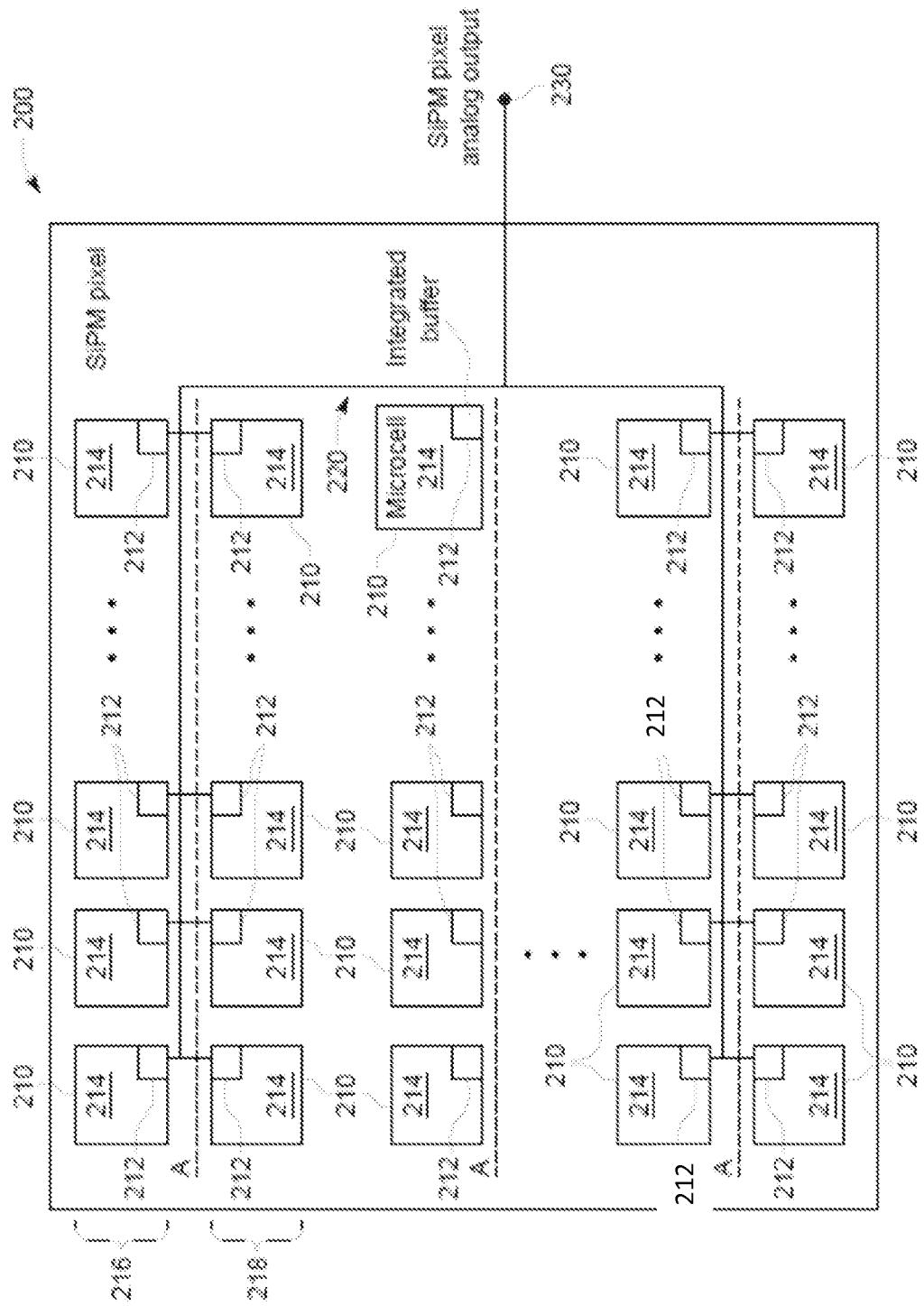
FIG. 2 depicts a schematic of a SiPM pixel in accordance with some embodiments.

FIG. 2 schematically depicts analog SiPM pixel 200 having an array of microcells 210 in accordance with embodiments. Each microcell 210 is fabricated on a wafer. The microcell includes SPAD 214 and electrical circuit 212. The electrical circuit is integrated within the microcell itself, and can be passive quenching circuits, active buffers, and/or a combination.

SiPM pixel 200 has constituent microcells arranged in accordance with some embodiments. The microcells of a pair of adjacent rows of SiPM pixel 200 are mirror images about dashed line A, which represents a midpoint between the pair of adjacent rows. By way of example, the microcells of row 216 each have buffer 212 fabricated at the lower right corner of the microcell. Mirror image row 218 of the pair of adjacent rows contains microcells with each buffer 212 fabricated at the upper right corner of the microcell.

The output from each microcell 210 is connected to trace 220. The path of trace 220 from each microcell output is symmetrically laid out to form a mirror image about a midline of SiPM pixel 200. For example, trace 220 is depicted in FIG. 2 as turning downward from rows 216, 218 towards the SiPM output 230. Accordingly, trace 220 turns upward towards output 230 from the last pair of mirror image microcell rows depicted at the bottom of SiPM pixel 200.

In accordance with embodiments, by symmetrically fabricating the microcells and the connecting trace to create a mirror image about a midline of the SiPM pixel as disclosed above, the propagation delay dispersion and pulse signal shape of the SiPM pixel is improved. Two adjacent rows share one single trace connecting to the pixel output 230, instead of using two traces. Sharing the single trace reduces the total parasitics of the pixel output. The mirror imaging placement of the adjacent rows reduces the impact of process, voltage and temperature variations on the performance of the SiPM device.

Improvement of these characteristics lead to improved coincidence resolving time (CRT) in PET measurements resulting in better imaging quality and system performance.

The layout of SiPM 200 depicted in FIG. 2 is for purposes of discussion. Embodying devices are not so limited. For example, the SiPM pixel can have vertical columns of microcells, where pairs of adjacent rows are mirrored about a vertical midpoint. Also, the integrated buffer can be positioned at any location within the microcell, and need not be limited to the depicted embodiment of upper and lower right corners.

Figure 3:
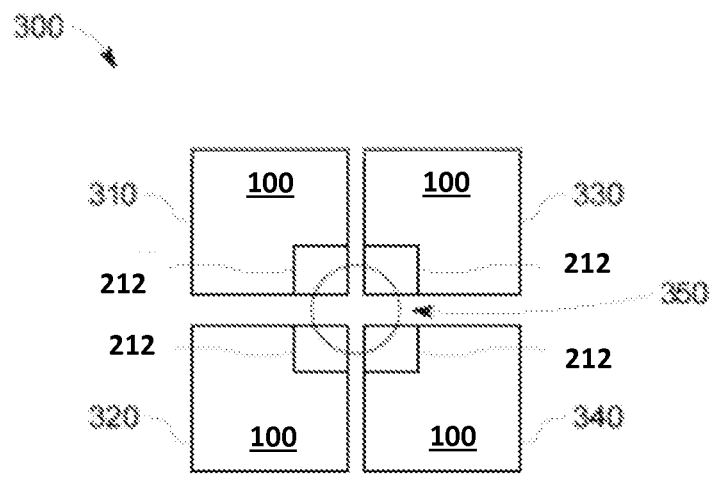
FIG. 3 depicts a schematic of a microcell grouping in accordance with some embodiments.

FIG. 3 depicts microcell grouping 300 in accordance with some embodiments. Microcell grouping includes four microcells 310, 320, 330, 340 and summing node trace 350. Each of microcells 310, 320, 330, 340 includes APD 100 and integrated buffer 212. In some embodiments, the microcell does not have active buffer.

The layouts of the four microcells in the grouping are mirror imaged along perpendicular midlines. For example, as depicted in FIG. 3, the integrated buffers of the lower two microcells are fabricated at the top of the corresponding microcell. The integrated buffers of the top two microcells are fabricated at the bottom of the corresponding microcell. Additionally, the left two microcells have the integrated buffers on their right corner, and the right two microcells have the integrated buffers on their left corner. As noted above with regard to the symmetry of the microcells of SiPM pixel 200, embodying devices are not so limited but are symmetrical (mirror imaged) about perpendicular midlines between the microcells of the grouping.

This grouping forms a basic unit group with a common-centroid layout for best matching to the summing node. For purposes of discussion, microcell grouping 300 can be referred to as level 0 unit group. The outputs of the four microcells are summed and available at summing node trace 350 for summing to the next higher hierarchy, as disclosed below.

Figure 4:
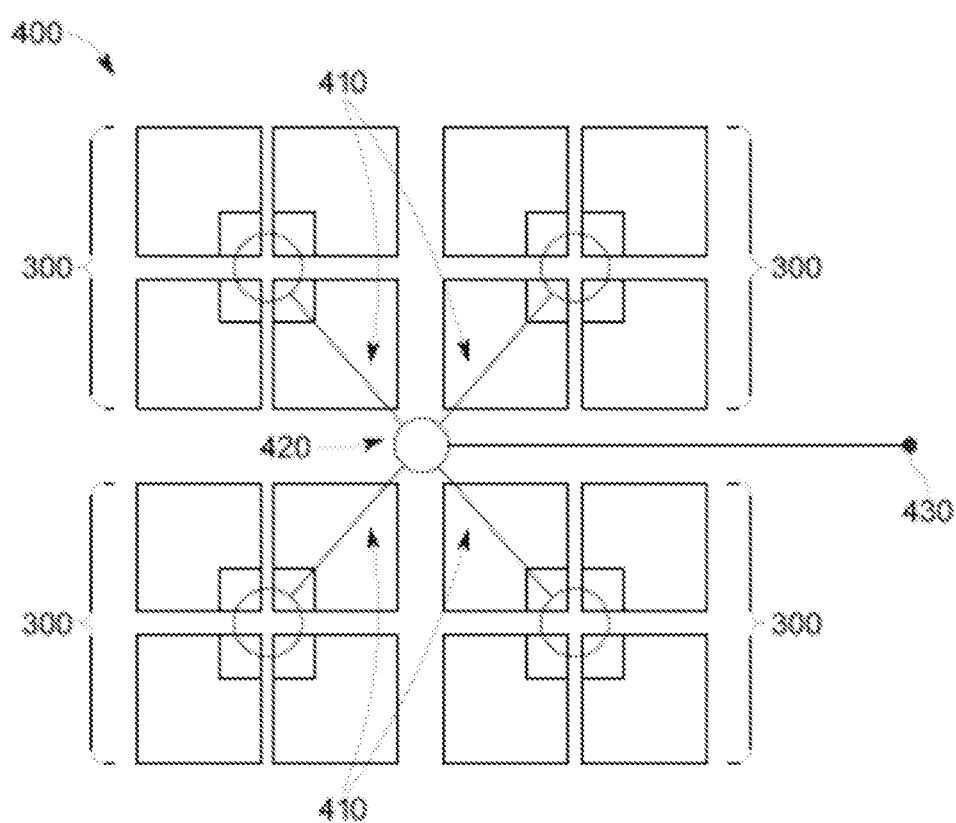
FIG. 4 depicts a schematic of a grouping of the microcell grouping of FIG. 3 in accordance with some embodiments.

FIG. 4 depicts grouping 400 containing four level 0 unit microcells 300 in accordance with some embodiments. For purposes of discussion, grouping 400 can be referred to as level 1 unit group. Grouping 400 includes summing node 420. The summing node has a common centroid layout for best matching. The output of each level 0 unit microcell is connected to summing node 420 by traces 410. Each trace of a level is of equal length to other traces of that level. Summing node 420 wire-sums the outputs from each of the constituent level 0 unit groups. The summed output 430 is available to the next higher hierarchy of groupings. In accordance with embodiments, level 1 unit group is fabricated on the wafer to maintain symmetry and mirror image properties as disclosed above. Having symmetry and mirror image fabrication results in improved propagation delay dispersion for the SiPM pixel.

Figure 5:
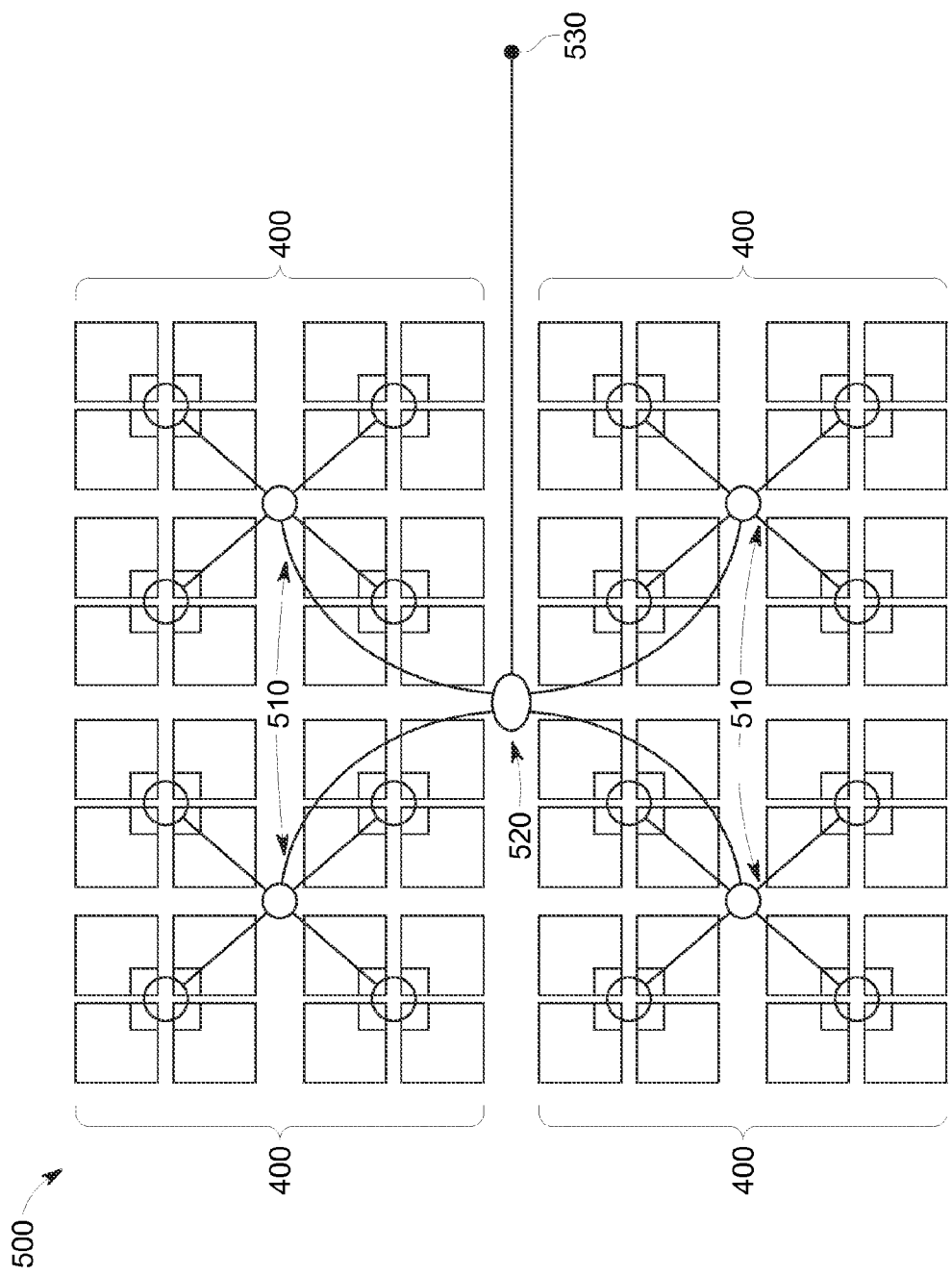
FIG. 5 depicts a schematic of a grouping of the microcell grouping of FIG. 4 in accordance with some embodiments.

FIG. 5 depicts grouping 500 containing four level 1 unit groups 400 in accordance with some embodiments. For purposes of discussion, grouping 500 can be referred to as level 2 unit group. Grouping 500 includes traces 510 (of equal length) that connect the summed outputs of each level 1 unit groups to summing node 520, which is positioned at a common centroid. The wire-summed output of summing node 520 is provided as output 530 to the next higher level in the hierarchy. As disclosed above and depicted in FIG. 5, the symmetry and mirror image positioning of the elements of grouping 500 are maintained to result in improved propagation delay dispersion for the SiPM pixel In accordance with embodiments, an analog SiPM pixel can be fabricated by grouping multiple unit groups of microcells with and/or without buffers in multi-level hierarchies as disclosed above.

Figure 6:
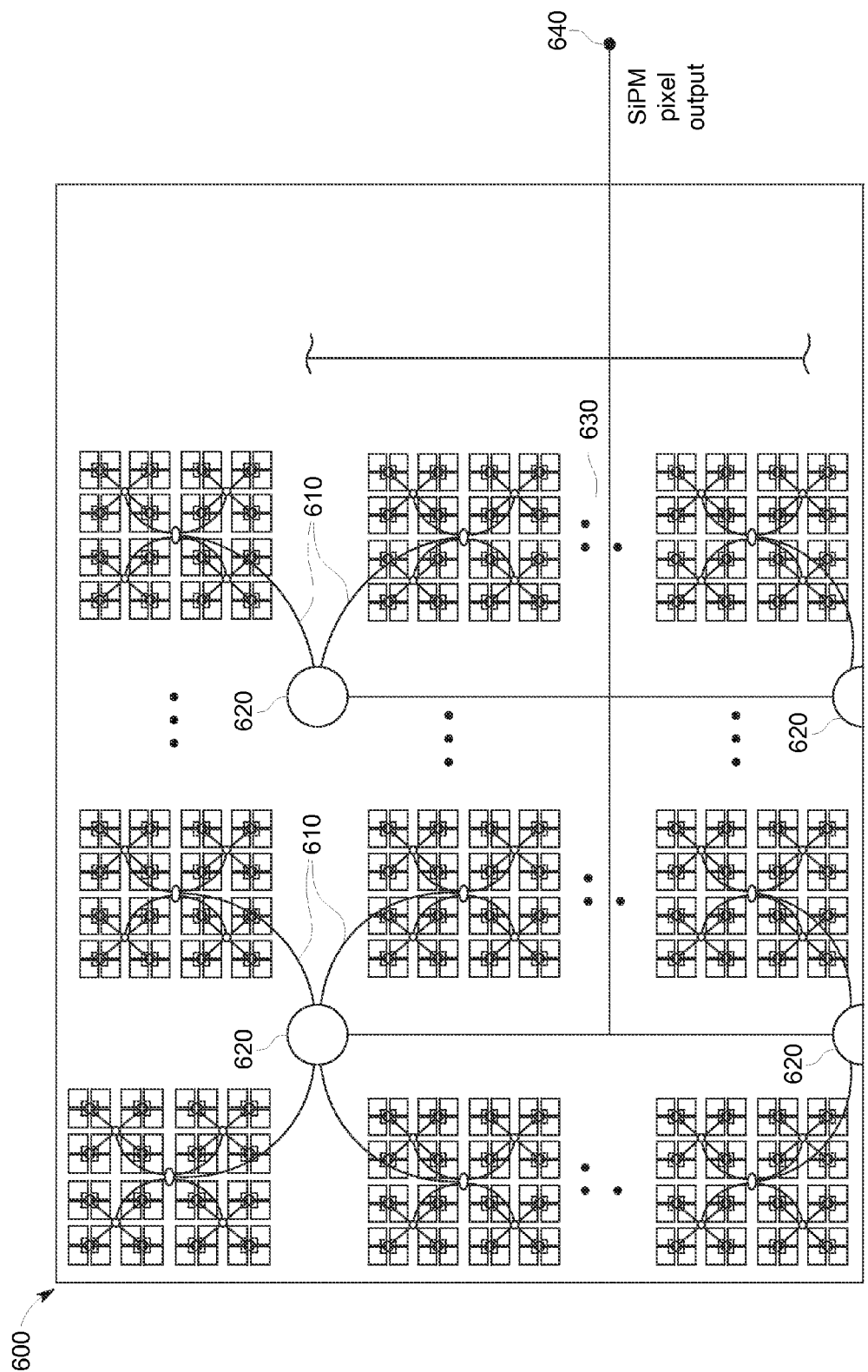
FIG. 6 depicts a schematic of a SiPM pixel comprised of microcell groupings of FIG. 5 in accordance with some embodiments.

FIG. 6 depicts a schematic of a partial view of SiPM pixel 600 that includes multiple units of level 2 unit group microcell groupings. SiPM pixel 600 is fabricated by symmetrically locating multiple units of microcell grouping 500 on a wafer. The placement of these multiple units is made to be a mirror image along perpendicular vertical and horizontal lines at the midsection of the SiPM pixel.

SiPM pixel 600 includes summing nodes 620 which are connected to summing nodes of the constituent level 2 unit groups by trace 610. The summing nodes of SiPM pixel are connected to trace 630, which wire-sums the aggregate of the individual level 2 unit groups. This aggregate sum is provided as SiPM pixel output 640.

Figure 7:
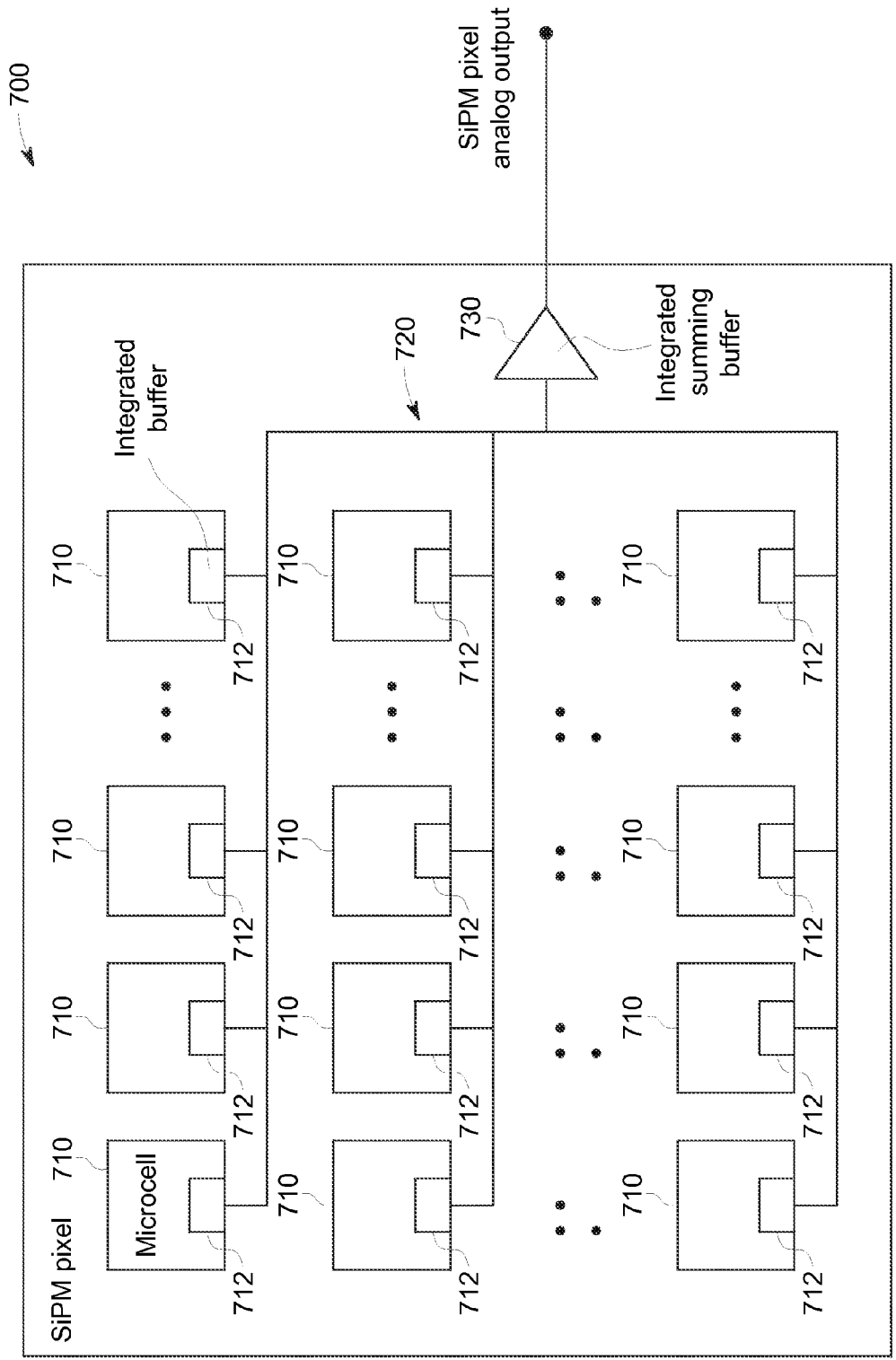
FIG. 7 depicts a schematic of a SiPM pixel in accordance with other embodiments.

FIG. 7 depicts SiPM pixel 700 in accordance with embodiments. SiPM pixel 700 includes an array of microcells 710, with each microcell including an integrated buffer 712. The outputs of the buffers for microcells of a row (or column) are summed by an active summer or wire-summed by connection to trace 720. SiPM Pixel also includes an integrated summing buffer 730 fabricated on the wafer along with the array of microcells. In accordance with some implementations, an integrated summing buffer can be fabricated for each row, or column. The row (or column) wire-summing, trace can be connected to an input for the corresponding row/column integrated buffer. The outputs from each of the integrated row/column buffer can be connected to an input of the integrated summing buffer 730.

In accordance with embodiments, the level 0 unit group disclosed above (FIG. 3) can be modified to include an integrated summing buffer fabricated on the same wafer. This integrated summing buffer can be connected to summing node trace 350. The buffered summation of the outputs of the level 0 unit group can then be provided to the next higher group in a hierarchy of groups. Each subsequent grouping (i.e., level 1 unit group, level 2 unit group, etc.) can then have an integrated summing buffer fabricated and connected to that level group's summing node trace. Fabrication of integrated summing buffers connected to the summing node trace matches the constituent microcells of the group and minimizes the propagation delay dispersion resulting in an improved output pulse shape.

Grouping microcells in accordance with embodiments can result in suppressed optical crosstalk. For example, grouping four microcells into the same level grouping to sum their outputs, as disclosed above, can achieve additional suppression by limiting the output pulse to level of one SPE. With this limitation any events with optical crosstalk across the microcells in this group will provide output signal only for first discharged microcell. This additional suppression is possible due to the probability of triggering two neighboring microcells by scintillation light is about less than 1%.

In accordance with embodiments, groups of microcells can be summed as analog signals and then digitized. Buffers, adders, pulse shapers, and/or comparators can be fabricated on the wafers along with the array of microcells to condition the analog pulse. In some implementations, these integrated pulse conditioners can be implemented at the level 1 group and higher levels. Such an implementation can simplify the front-end and back-end electronics.

In accordance with embodiments, a triggering network can be adjusted to trigger based on the arrival of a first, second, and/or any number of photons by incorporating an external controller (e.g., FPGA, etc.). The triggering network can be adjusted by changing a triggering threshold through the controller. The triggering threshold level can be selected based on timing measurements of the SiPM performance. The threshold level can be determined by a user based on the user's implementation of the microcell array. A user can observe the triggering threshold result on a monitor, and provide data to the external controller. The external controller can provide the adjusted triggering threshold to the SiPM pixel array.

Implementation of an embodying triggering network can allow for precise detection of triggers down to resolution as low as one photon arrival. By adjusting the triggering network threshold to a predetermined level, precise optimization of a detection system can be achieved. Obtaining a distinct and precise trigger level can improve the CRT timing in, for example, SiPM PET detectors. Optimization of CRT timing can reduce the detector system cost and improve overall system performance.

Figure 12A:
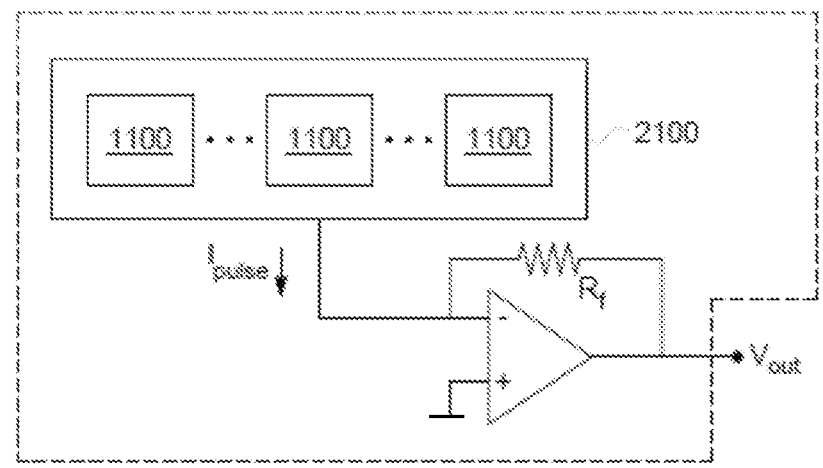
FIGS. 12A-12E depict configurations of a group of microcells in combination with microcell electronics in accordance with some embodiments.
Figure 12B:
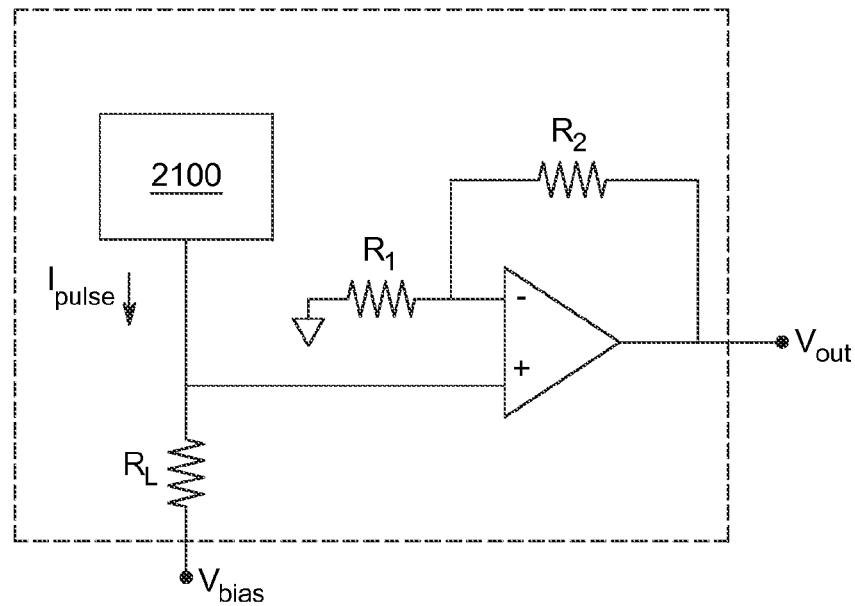
Figure 12C:
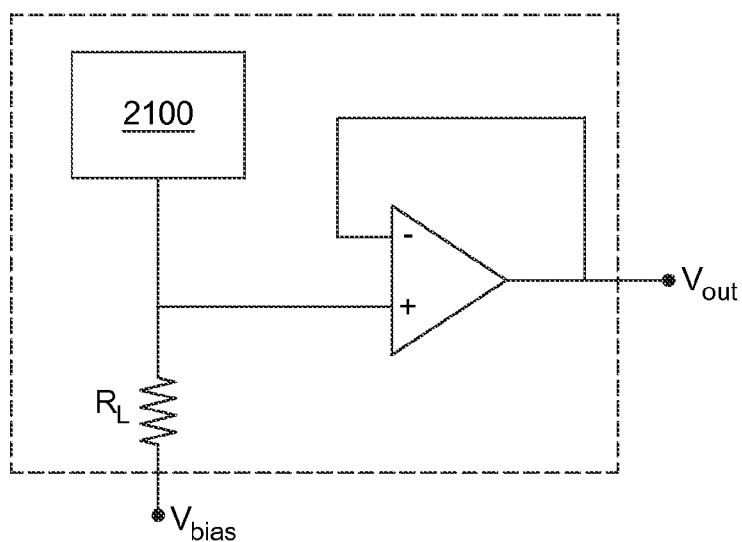
Figure 12D:
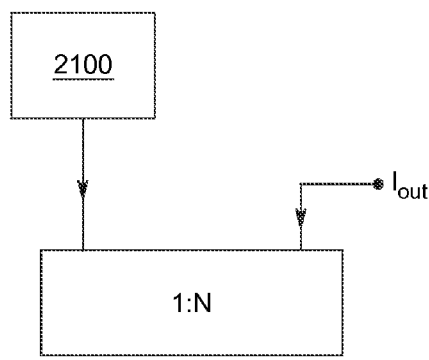
Figure 12E:
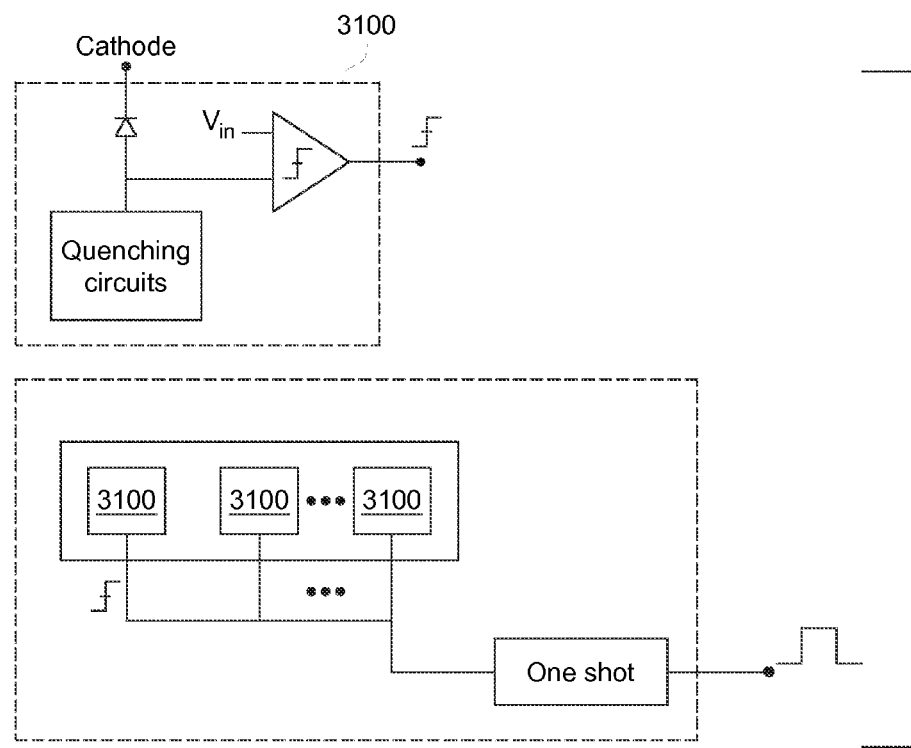

FIG. 8 depicts microcell grouping 800 in accordance with some embodiments. Grouping 800 includes nine neighboring microcells 810 and microcell electronics 820. FIGS. 12A-12E depict configurations of microcell grouping 2100 in combination with microcell electronics in accordance with embodiments. The microcell electronics could be a voltage (FIG. 12A) or current (FIG. 12B) analog buffer, a non-inverting unity gain buffer (FIG. 12C), or a current buffer with a gain of N (FIG. 12D). In other implementations, a HSiPM grouping of HSiPM microcells 3100 can be buffered with a one-shot circuit (FIG. 12E).

Figure 8A:
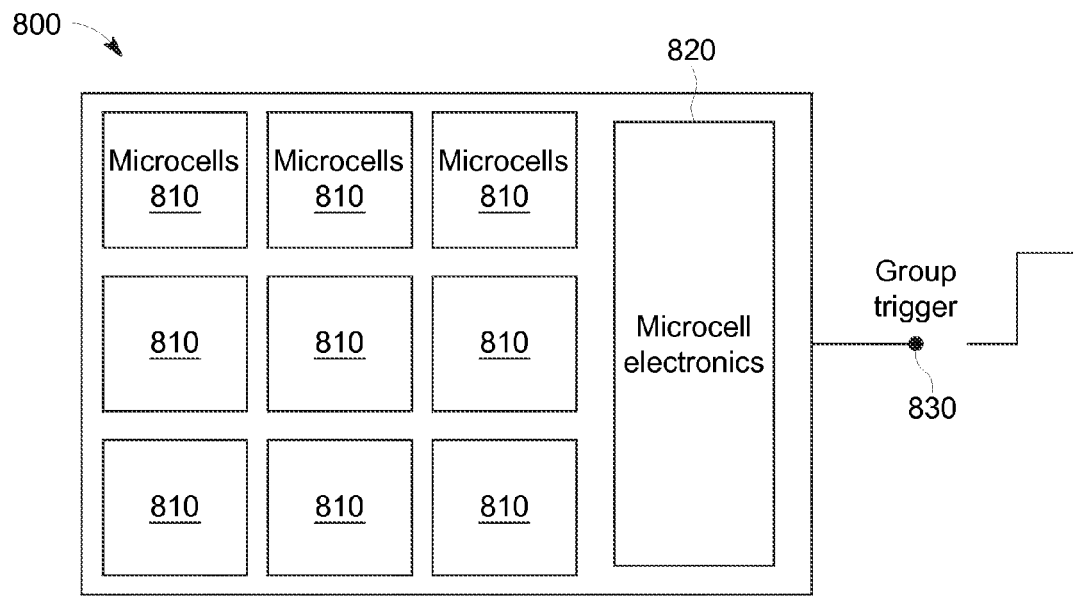
FIGS. 8A-8B depict a grouping of microcells in accordance with some embodiments.
Figure 8B:
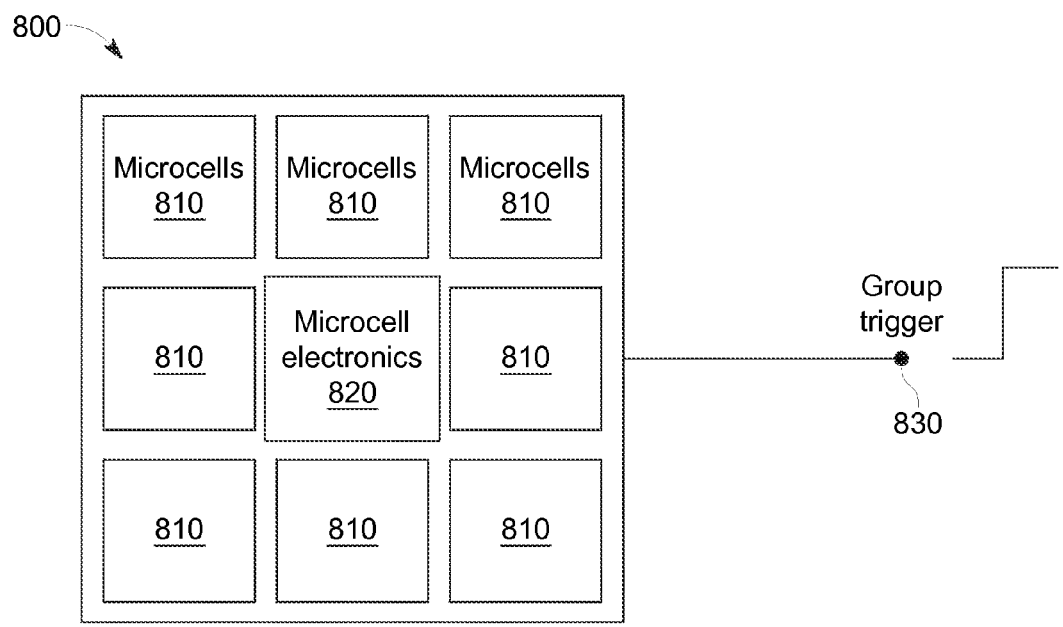

With regard to FIG. 8A, the nine microcells 810 form a 3×3 matrix. However, embodying groupings are not so limited; other matrix dimensions can be implemented, and the actual physical placement and layout of the microcells and electronics might be different than showing in the diagram. For example, the microcell electronics 820 can be placed at the geometry center of the microcell group as shown in FIG. 8B.

The microcells of grouping 800 (e.g., nine microcells forming a 3×3 matrix) can be wire-summed in an analog fashion with a common-centroid layout for best matching to the summing node as disclosed above. This wire-summed output pulse 830 can generate a trigger at the basic group level. The propagation delay dispersion within the group is minimal. This grouping forms a basic unit group. For purposes of discussion, microcell grouping 800 can be referred to as level 0 unit group. Four basic level 0 unit groups can be arranged in common-centroid fashion (e.g., as a 2×2 matrix other matrix dimensions can be implemented) to form a level 1 group.

Figure 9:
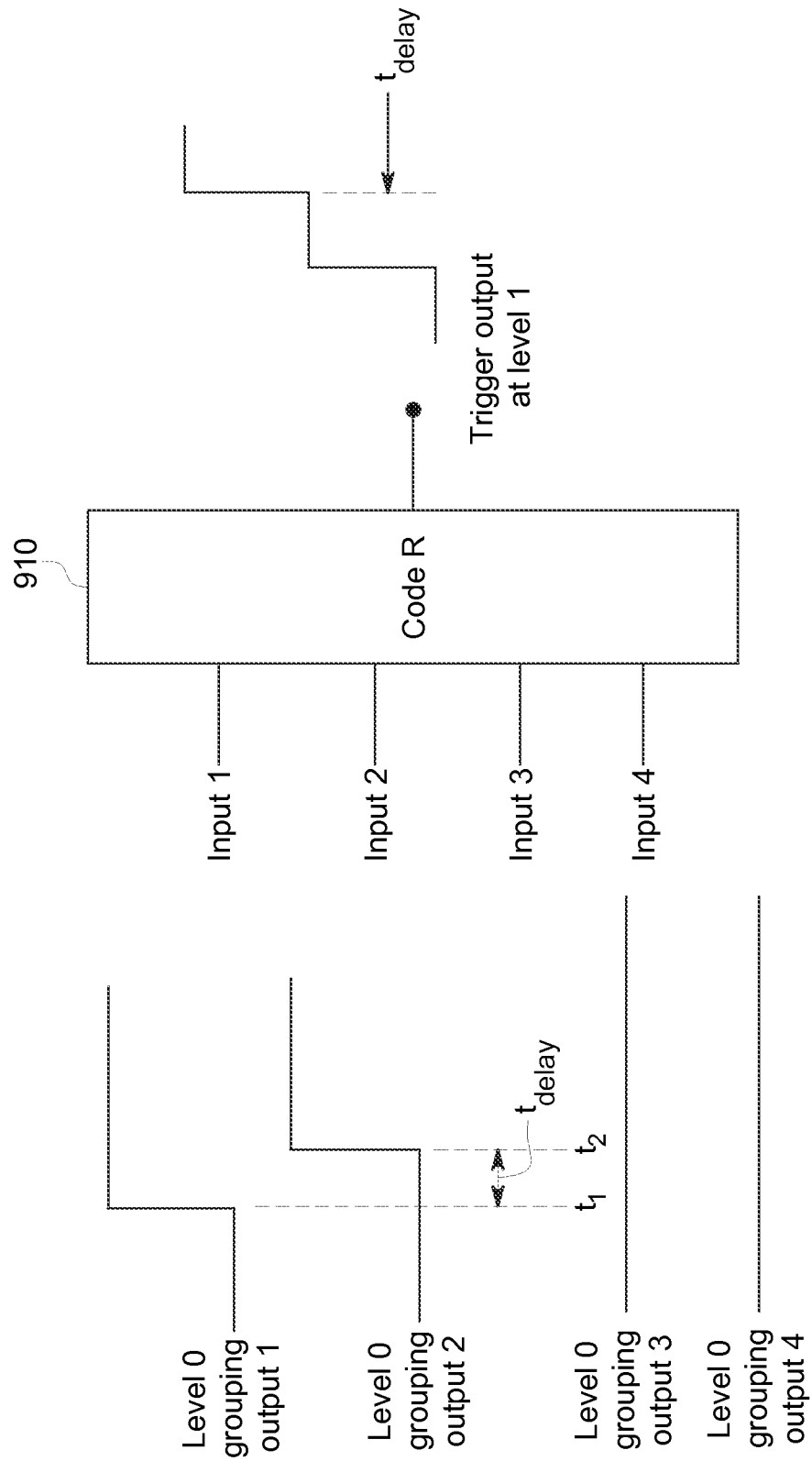
FIG. 9 depicts a microcell coder in accordance with some embodiments.

FIG. 9 depicts microcell coder 910 with four inputs in accordance with some embodiments. The triggers from basic level 0 groups can be processed in an analog fashion. By way of example, coder 910 is implemented as a coder for a 2×2 matrix consisting of four level 0 groups. The four inputs to coder 910 are the respective outputs of the basic level 0 group.

In accordance with embodiments, the four inputs can be pulse code modulated (e.g., summed in an analog fashion). In accordance with embodiments, coder 910 can be implemented as a two-level coder, or a two-bit digital-analog-converter (DAC).

FIG. 9 depicts level 0 group outputs 1-4. The microcells of level 0 group 1 have a pulsed output that indicates excitation by a first photon for group 1 at t1. The microcells of level 0 group 2 have a pulsed output that indicates excitation by a first photon for group 2 at t2. A time delay tdelay can exist between the photon excitations. For purposes of this example, level 0 groups 3-4 are not excited by photon(s). The coder output (trigger output level 1) is a pulse code modulated waveform, containing the first and second photon trigger information.

Figure 13A:
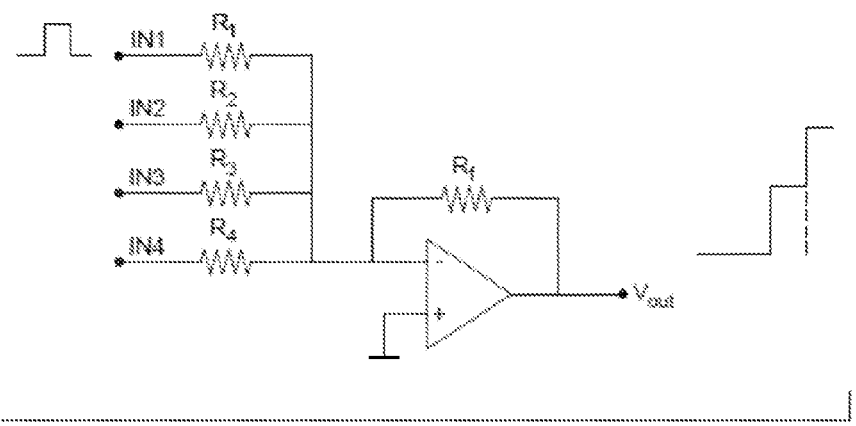
FIGS. 13A-13B depict configurations of the microcell coder of FIG. 9.
Figure 13B:
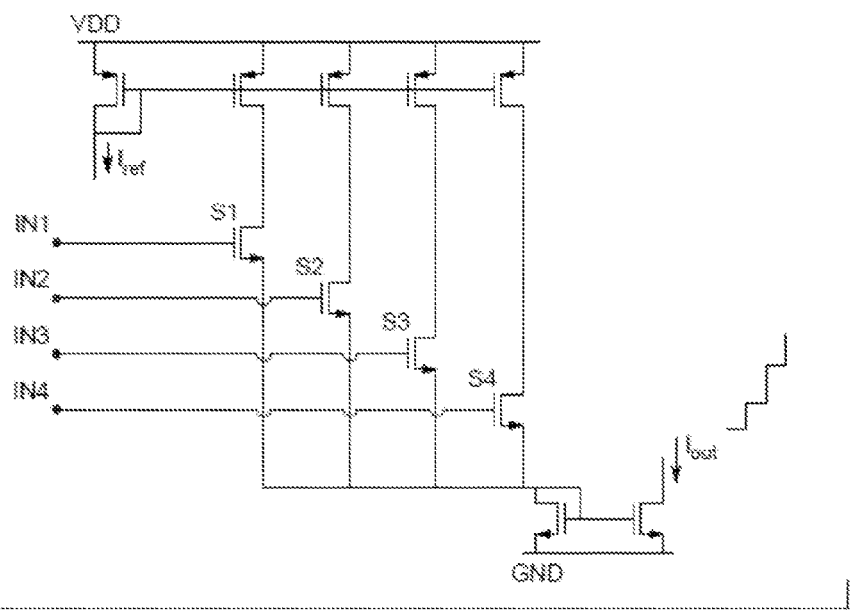

FIG. 13A depicts a voltage mode configuration of coder 910. As an input one-shot pulse appears on each of the inputs IN1-IN4, the voltage at the input to the OP AMP negative terminal increases, causing a step function in the output voltage Vout. FIG. 13B depicts a current mode configuration of coder 910. Switches S1-S4 are closed by inputs IN1-IN4, respectively. With the closing of each switch, the current at the output of the current source increases in a step function. The input one-shot pulse can be from a single HSiPM microcell, or a group of HSiPM microcells.

In accordance with embodiments, a detector pixel can be built up by interconnecting level 1 groups into next higher levels in a hierarchy, and then combining that higher level into a next higher level as disclosed above.

Figure 10:
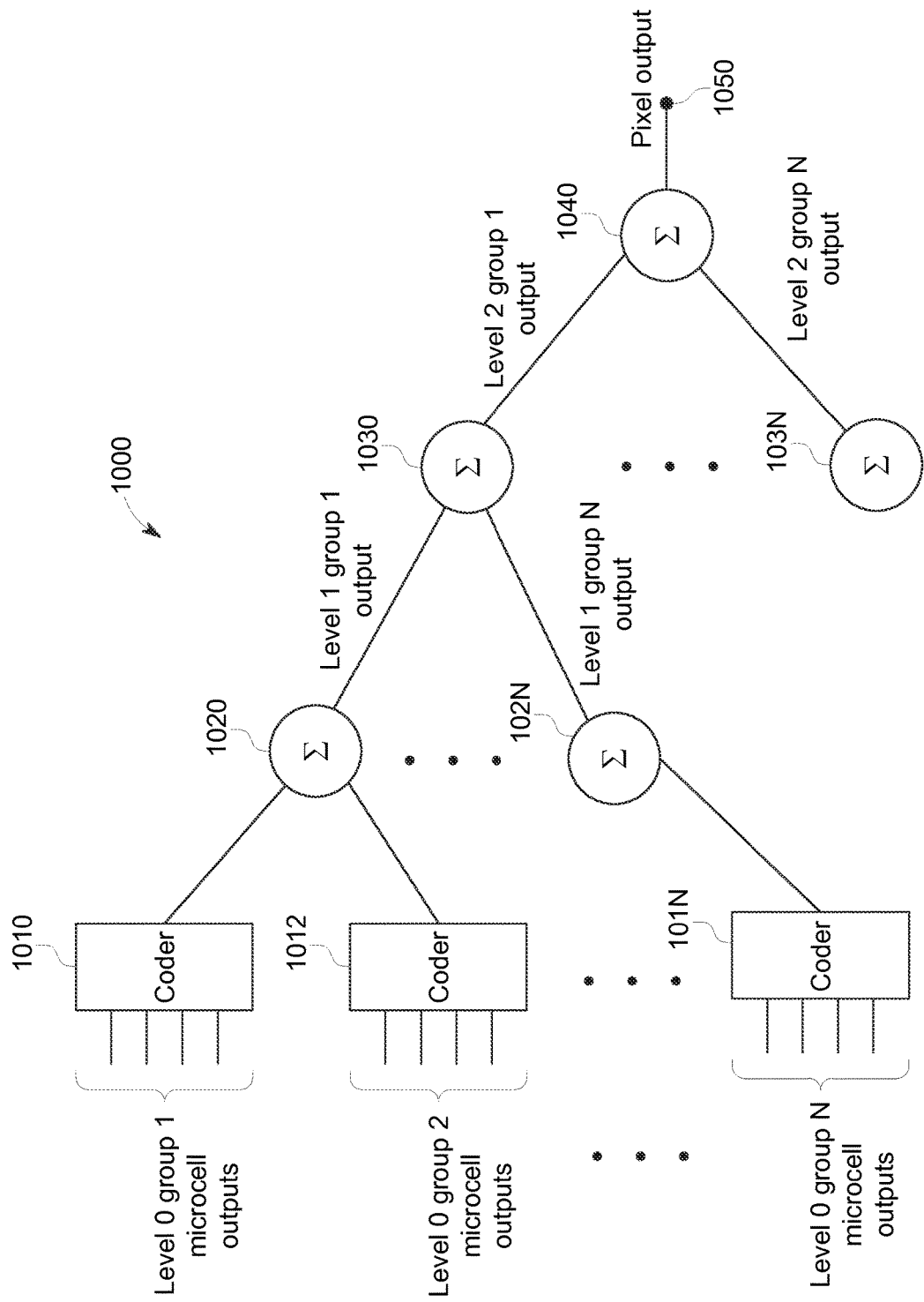
FIG. 10 depicts a trigger network in accordance with some embodiments.

FIG. 10 depicts trigger network 1000 including coder 1010, 1012, . . . , 101N and summing nodes 1020-102N, 1030-103N, 1040 in accordance with some embodiments.

As disclosed with reference to FIG. 9, coder 1012, . . . , 101N each receive as inputs the outputs from respective level 0 group 1 matrices of microcells. Each coder provides its respective pulse code modulated output (level 0 group output) to a respective level 1 summing node 1020, . . . , 102N. Each of the respective summing nodes is provided as input the output from one level 1 group (e.g., the 2×2 matrices). The level 1 summing nodes provide a level 1 group output for its constituent level 1 groupings. These level 1 group outputs can be provided as respective input to level 2 summing node 1030, . . . , 103N. The quantity of level 2 summing nodes is dependent on the overall size and hierarchy of the SiPM pixel. Each of the level 2 summing nodes provides a level 2 group output as input to level 3 summing node 1040. In the depicted embodiment, these level 2 outputs are summed by summing node 1040 and provided as the pixel output 1050. In accordance with embodiments, there can be more than one level 3 summing node depending on the hierarchical levels and size of the pixel, as disclosed above.

Figure 14:
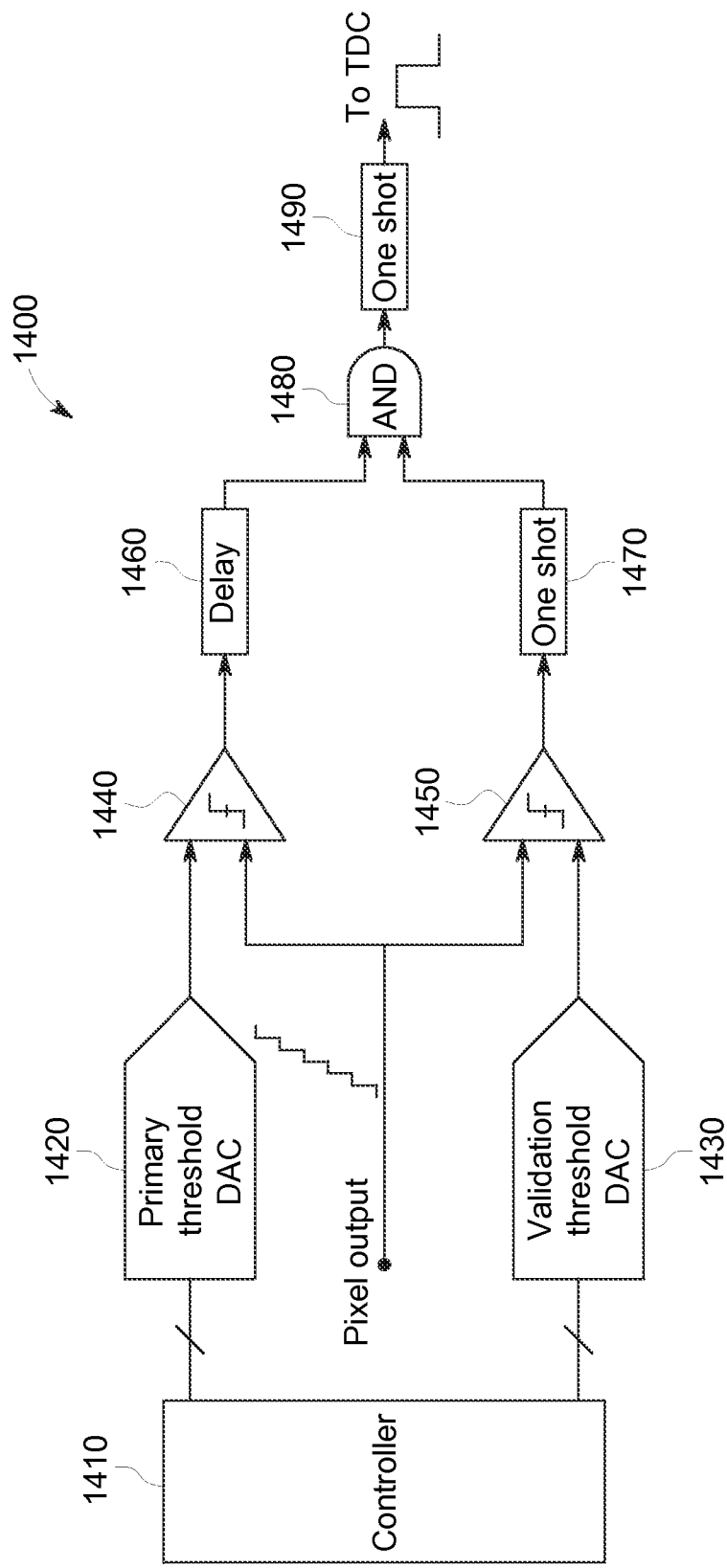
FIG. 14 depicts a timing pick-up circuit for a pixel in accordance with some embodiments.

FIG. 14 depicts timing pick-up circuit 1400 for a pixel in accordance with some embodiments. The timing pick-up circuit is configured to verify whether a real event has been detected by the pixel. The timing pick up circuit 1400 includes controller 1410 (e.g., a FPGA, etc.), which provides a primary threshold level to primary threshold DAC 1420 and a validation threshold level to validation threshold DAC 1430. The analog primary threshold level is provided to a reference input to primary discriminator 1440. The analog validation threshold level is provided to a reference input of validation discriminator 1450. The primary and validation discriminators can be, for example, a comparator, an operational amplifier, etc.

Output from a pixel is provided to the inputs of both the primary and validation discriminators. The primary discriminator is configured to detect the leading edge of an event that is above the primary threshold level. The primary threshold level can be set at a desired number of photon level. The output of primary discriminator 1440 is connected to delay circuit 1460 which causes a timing delay in the discriminator output. The delayed output is provided a one input to AND gate 1480.

Validation discriminator 1450 is also configured to detect the leading edge of a pixel signal. Validation can be adjusted by setting the validation threshold level to a higher level. The output of the validation discriminator is provided to one-shot circuit 1470, which generates a one-shot pulse waveform. This one-shot waveform is provided as another input to AND gate 1480.

The AND gate provides an input to one-shot circuit 1490 if both the delayed primary discriminator signal and the validation discriminator one-shot pulse are present at the AND gate inputs together. One-shot circuit 1490 generates a validated one-shot pulse as an output which is provided to a TDC.

Although specific hardware and methods have been described herein, note that any number of other configurations may be provided in accordance with embodiments of the invention. Thus, while there have been shown, described, and pointed out fundamental novel features, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated.

The invention claimed is:

1. A silicon photomultiplier array comprising:
 a plurality of microcells having an output providing a pulse output in response to an incident radiation;
 a plurality of traces of equal length interconnecting each microcell output to one of a respective summing node and a respective integrated buffer amplifier, the integrated buffer amplifier configured to provide an output if a level of the incident radiation exceeds a threshold level;
 a trigger network including a controller configured to receive a threshold level setting from a user input, the controller configured to provide a threshold level reference to the respective integrated buffer amplifier;
 a trigger validation circuit configured to receive from the controller a primary threshold level and a validation threshold level, the primary threshold and the validation threshold levels each converted to an analog level by respective digital-to-analog converters;
 a primary discriminator configured to compare a pixel output signal to the analog primary threshold level, and to provide an output to a delay circuit if a leading edge of the pixel output signal is above the analog primary threshold level;
 a validation discriminator configured to compare the pixel output signal to the analog validation threshold level and provide an output to a first one-shot circuit if the pixel output signal is above the analog validation threshold level;
 an AND gate configured to compare a delay circuit output and a first one-shot circuit output, and provide a signal to a second one-shot circuit if the comparison indicates both signals present; and
 the second one-shot circuit configured to provide a pulse output to a time-to-digital converter.

2. The silicon photomultiplier array of claim 1, including the integrated buffer amplifier is one of a unity gain voltage mode amplifier, a unity gain current mode amplifier, and a defined gain amplifier.

3. The silicon photomultiplier array of claim 1, including:
 the plurality of microcells arranged in one of columns and rows; and
 a first group of the arranged plurality of microcells being a mirror image of a second group of the arranged plurality of microcells about a midpoint between one of the columns and rows.

4. The silicon photomultiplier array of claim 3, including respective circuit traces connecting respective microcell outputs of adjacent one of columns and rows.

5. The silicon photomultiplier array of claim 1, including:
 the plurality of microcells arranged in a plurality of mirror image groupings symmetric about perpendicular midlines of the mirror image groupings; and
 the microcells of each mirror image grouping being mirror images of a corresponding microcell across the perpendicular midlines of the grouping.

6. The silicon photomultiplier array of claim 5, including one of a respective first summing node and a first respective integrated buffer amplifier connected by symmetric traces to a subset of respective mirror image groupings, the respective first summing node and the subset of respective mirror image groupings forming a first unit group.

7. The silicon photomultiplier array of claim 6, including each respective first summing node located at a common centroid of each respective first unit group.

8. The silicon photomultiplier array of claim 6, including respective second unit groups including one of a respective second summing node and a second respective integrated buffer amplifier, the second unit groups connected by symmetric traces to a subset of first unit groups.

9. The silicon photomultiplier array of claim 8, including each respective second summing node located at a common centroid of each respective second unit group.

10. The silicon photomultiplier array of claim 6, including respective third unit groups including one of a respective third summing node and a third respective integrated buffer amplifier, the third unit groups connected by symmetric traces to a subset of second unit groups.

11. The silicon photomultiplier array of claim 10, including each respective third summing node located at a common centroid of each respective third unit group.

12. The silicon photomultiplier array of claim 1, including the threshold level setting based on observed timing measurement performance of the silicon photomultiplier array.

13. The silicon photomultiplier array of claim 1, including the trigger network configured to detect photon arrival to a resolution of one or more photons.

14. The silicon photomultiplier array of claim 6 including:
 each microcell of the first unit group being from the first subgroup of the microcell subgroupings; and
 respective second unit groups connected by symmetric traces to a subset of first unit groups, each microcell of the second unit groups being from the second subgroup of the microcell subgroupings.

15. The silicon photomultiplier array of claim 14, including each summing node located at a common centroid of each respective unit group.

16. The silicon photomultiplier array of claim 14, including each integrated buffer amplifier located at a common centroid of each respective unit group.

17. The silicon photomultiplier array of claim 1, including:
- a microcell coder connected to a plurality of outputs from the microcell subgroupings, the microcell coder providing a pulse coded modulated output containing information on the incident radiation response of two or more of the plurality of microcells; and
- the microcell coder configured as one of a voltage mode and a current mode coder.

* * * * *